(12) United States Patent
Kuwabara

(10) Patent No.: US 12,330,215 B2
(45) Date of Patent: Jun. 17, 2025

(54) ALLOY MEMBER PRODUCTION METHOD AND ALLOY MEMBER

(71) Applicant: Proterial, Ltd., Tokyo (JP)

(72) Inventor: Kousuke Kuwabara, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 537 days.

(21) Appl. No.: 17/639,747

(22) PCT Filed: Sep. 2, 2020

(86) PCT No.: PCT/JP2020/033200
§ 371 (c)(1),
(2) Date: Mar. 2, 2022

(87) PCT Pub. No.: WO2021/054119
PCT Pub. Date: Mar. 25, 2021

(65) Prior Publication Data

US 2022/0331870 A1    Oct. 20, 2022

(30) Foreign Application Priority Data

Sep. 20, 2019   (JP) .................................. 2019-171636

(51) Int. Cl.
*B22F 10/28* (2021.01)
*B22F 1/00* (2022.01)
(Continued)

(52) U.S. Cl.
CPC ............... *B22F 10/28* (2021.01); *B22F 1/00* (2013.01); *B22F 9/08* (2013.01); *B22F 10/64* (2021.01);
(Continued)

(58) Field of Classification Search
None
See application file for complete search history.

(56) References Cited

U.S. PATENT DOCUMENTS

| 11,492,685 B2 * | 11/2022 | Fujieda | ................... B22F 10/64 |
| 2017/0209922 A1 * | 7/2017 | Kato | ..................... B22D 23/00 |

(Continued)

FOREIGN PATENT DOCUMENTS

| CN | 107427897 A | 12/2017 |
| CN | 108699643 A | 10/2018 |

(Continued)

OTHER PUBLICATIONS

International Search Report issued in PCT Application No. PCT/JP2020/033200 dated Nov. 10, 2020.

(Continued)

*Primary Examiner* — George Wyszomierski
(74) *Attorney, Agent, or Firm* — Marshall, Gerstein & Borun LLP

(57) ABSTRACT

Provided are: a method for producing an alloy member that is fabricated by additive manufacturing and has increased mechanical strength and ductility as well as higher corrosion resistance; and the alloy member produced from this method. The alloy member production method comprises: an additive manufacturing step for forming products by additive manufacturing using an alloy powder including each of Co, Cr, Fe, Ni, and Ti in the range of 5-35 atom % and Mo in the range of greater than 0 atom % and 8 atom % or less, the balance comprising unavoidable impurities; a heat treatment step for raising a temperature of the products through heating, and holding the products in the temperature range of 1080-1180° C.; and a forced cooling step for cooling the products after the heat treatment in the temperature range from the holding temperature to 800° C. at a cooling rate of 110-2400° C./min.

9 Claims, 8 Drawing Sheets

(51) Int. Cl.
  *B22F 9/08* (2006.01)
  *B22F 10/64* (2021.01)
  *B33Y 70/00* (2020.01)
  *C21D 9/00* (2006.01)
  *C22F 1/10* (2006.01)
  *B33Y 10/00* (2015.01)
  *B33Y 80/00* (2015.01)

(52) U.S. Cl.
  CPC ............ *B33Y 70/00* (2014.12); *C21D 9/0068* (2013.01); *C22F 1/10* (2013.01); *B22F 2301/15* (2013.01); *B33Y 10/00* (2014.12); *B33Y 80/00* (2014.12)

(56) References Cited

U.S. PATENT DOCUMENTS

| | | | |
|---|---|---|---|
| 2018/0100223 A1 | 4/2018 | Kobayashi et al. |
| 2019/0047049 A1 | 2/2019 | Fujieda et al. |
| 2019/0226058 A1 | 7/2019 | Fujieda et al. |
| 2020/0290118 A1 | 9/2020 | Chen et al. |

FOREIGN PATENT DOCUMENTS

| | | | |
|---|---|---|---|
| CN | 109689908 A | 4/2019 |
| EP | 3415652 A1 | 12/2018 |
| EP | 3527680 A1 | 8/2019 |
| JP | 2018-145456 A | 9/2018 |
| KR | 20170019558 A | 2/2017 |
| WO | WO-2016/013493 A1 | 1/2016 |
| WO | WO-2016/013494 A1 | 1/2016 |
| WO | WO-2017/138191 A1 | 8/2017 |
| WO | WO-2019/031577 A1 | 2/2019 |
| WO | WO-2019/088157 A1 | 5/2019 |

OTHER PUBLICATIONS

Written Opinion issued in PCT Application No. PCT/JP2020/033200 dated Nov. 10, 2020.
Notice of Reasons for Refusal issued in Japanese Patent Application No. 2021-521316 dated Jun. 28, 2021.
Decision to Grant a Patent issued in Japanese Patent Application No. 2021-521316 dated Sep. 6, 2021.
Extended European Search Report, corresponding EP Application No. 20 86 6444.1, mailing date Sep. 1, 2023.
Office Action, Chinese patent application No. 202080059800.4, mailing date Mar. 27, 2024.
Office Action, Communication pursuant to Article 94(3) EPC, European patent application No. 20 866 444.1, mailing date Jul. 5, 2024.
Office Action, Chinese patent application No. 202080059800.4, mailing date Sep. 21, 2023.
Written Opinion issued in Singapore Pat. Appl. No. 11202202005R, dated Jun. 2, 2023.
Written Opinion issued in Singapore Pat. Appl. No. 11202202005R, dated Oct. 4, 2024.

\* cited by examiner

ALLOY MEMBER PRODUCTION METHOD AND ALLOY MEMBER

TECHNICAL FIELD

The present invention relates to a method for producing an alloy member by additive manufacturing, and the alloy member produced from the method.

BACKGROUND

In recent years, high entropy alloys (HEA) have been proposed. HEA are alloys of a new technological idea that is distinctively different from technological ideas for conventional alloys (e.g., an alloy comprising one to three types of major component elements added with small amounts of plurality of sub-component elements). HEA are defined as alloys that are formed of five or more major metal elements (each of which has a concentration between 5 and 35 atomic percent (at %)), and are known to show properties (a)-(d) below. Also, multi-principal element alloys (MPEA), which are alloys of another idea, having a plurality of major elements and allowing presence of multiple phases at the same time, have been recently proposed. The present application will treat HEA and MPEA as the same idea, and refer both collectively as HEA.

The properties of HEA are: (a) stabilized mixed state due to a negative increase in the mixing entropy in Gibb's free energy equation; (b) slow diffusion due to complex microstructures; (c) high hardness and low temperature dependency of mechanical properties due to severe lattice distortion resulting from difference in sizes of component atoms; (d) improved corrosion resistance due to combined effects (also known as cocktail effects) of coexistence of multiple elements; and so on.

International Patent Publication WO2019/031577 discloses an alloy member having a chemical composition that includes each of cobalt (Co), chromium (Cr), iron (Fe), nickel (Ni), and titanium (Ti), each ranging from 5 at % to 35 at %, Mo in a range of greater than 0 at % and 8 at % or less, and unavoidable impurities for the remainder, where minute precipitates with an average grain diameter of 100 nm or less are deposited and dispersed among crystal grains of a parent phase.

According to International Patent Publication WO2019/031577, it is possible to obtain a microstructure where nanoscopic scale minute precipitates are deposited and dispersed among crystal grains of a parent phase by applying a particular heat treatment to products fabricated by additive manufacturing, and, as a result, to provide an alloy member having remarkably improved mechanical strength, ductility, and corrosion resistance.

According to the technology of International Patent Publication WO2019/031577, it is possible to obtain by additive manufacturing a member that excels in tensile strength, ductility, and corrosion resistance. However, to apply such the alloy member to more severe use environments, further improvement in corrosion resistance has been awaited.

The invention in International Patent Publication WO2019/031577 includes an air-cooling or water-cooling process after a pseudo-solution heat treatment. International Patent Publication WO2019/031577 describes that rapid cooling in a temperature range from 900° C. to 800° C. after the pseudo-solution heat treatment at this time results in difference of the average grain diameter of the minute precipitates, thereby enabling to improve the mechanical strength and ductility. However, no further consideration has been given to the cooling process, and there still is a place left for further consideration in improvement on the mechanical properties and corrosion resistance.

Due to above reasons, it is an object of the present invention to provide a method for producing an alloy member that is fabricated by additive manufacturing and has increased mechanical strength and ductility and higher corrosion resistance, and the alloy member.

SUMMARY OF THE DISCLOSURE

A method for producing an alloy member according to an aspect of the present invention includes an additive manufacturing step for forming products by additive manufacturing using an alloy powder including each of Co, Cr, Fe, Ni, and Ti in a range between 5 at % and 35 at %, Mo in a range of greater than 0 at % and 8 at % or less, and unavoidable impurities for the remainder; a heat treatment step for raising a temperature of the products through heating and holding the products at a temperature between 1080° C. and 1180° C.; and a forced cooling step for cooling the products after the heat treatment in a temperature range from a holding temperature to 800° C. at a cooling rate between 110° C./min and 2400° C./min.

A method for producing an alloy member according to another aspect of the invention includes an additive manufacturing step for forming products by additive manufacturing using an alloy powder including each of Co, Cr, Fe, Ni, and Ti in a range between 5 at %, and 35 at %, Mo in a range of greater than 0 at % and 8 at % or less, and unavoidable impurities for the remainder; a heat treatment step for raising a temperature of the products through heating and holding the products at a temperature between 1080° C. and 1180° C.; a forced cooling step for cooling the products after the heat treatment in a temperature range from a holding temperature to 800° C. at a cooling rate between 110° C./min and 2400° C./min; and an aging treatment step for applying aging treatment to the products at a temperature ranging from 500° C. to less than 900° C. after the forced cooling step.

Yet another aspect of the present invention is an alloy member including each of Co, Cr, Fe, Ni, and Ti in a range between 5 at % and 35 at %, Mo in a range of greater than 0 at % and 8 at % or less, and unavoidable impurities for the remainder, where a grain morphology of a parent phase is an equiaxed system, minute precipitates having an average diameter of 100 nm or less are deposited and dispersed among crystal grains of the parent phase, and deposition of hexagonal precipitates in crystal grain boundaries of the parent phase is less than 1 vol %.

The present invention can provide a method for producing an alloy member that is fabricated by additive manufacturing and has increased mechanical strength and ductility and higher corrosion resistance, and the alloy member.

BRIEF DESCRIPTION OF THE DRAWINGS

FIG. 4A is an image view observed under a scanning electron microscope (SEM), FIG. 4B is an image view observed under a scanning transmission electron microscope (STEM).

FIG. 5A and FIG. 5B are image views observed under the scanning electron microscope (SEM) of before and after a corrosion test. FIG. 5C is an image view observed under the scanning transmission electron microscope (STEM).

DETAILED DESCRIPTION

[Basic Ideas of the Present Invention]

Figure 1:
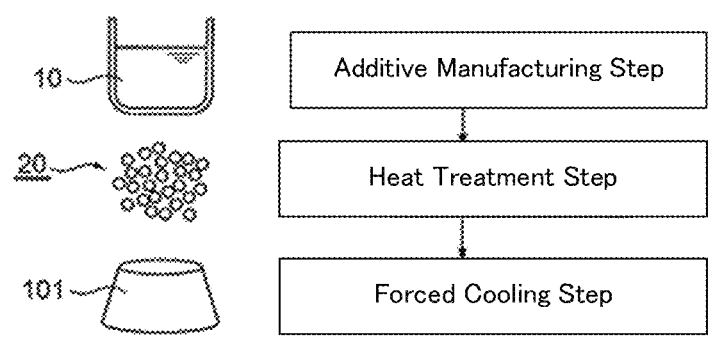
FIG. 1 is a process drawing illustrating an example of a method for producing an alloy member according to the present invention.

First, to develop an HEA member having excellent shape controllability and ductility (hereinafter, called as an alloy member) without sacrificing HEA properties, inventors of the present invention made extensive research in composition of an alloy and a method for producing the same. Consequently, the inventors were able to obtain, by forming products by additive manufacturing using Co—Cr—Fe—Ni—Ti—Mo alloy powder, an alloy member having better shape controllability and higher mechanical strength, ductility, and corrosion resistance than HEA members produced by traditional normal forging. That is, it is found out that applying a heat treatment at a temperature between 1080° C. and 1180° C. forms microstructures in which nanoscopic scale minute precipitates are deposited and dispersed, and this drastically improves both mechanical strength and ductility. Specifically, it has been confirmed that the shape of the member can be formed freely and the near net shape alloy member can be obtained. It has been also confirmed that such the alloy member has excellent mechanical properties (for example, tensile strength of 1100 MPa or more and elongation at break of 10% or more). In addition, it has been confirmed that such the alloy member has higher pitting potential for generation of pitting corrosion and excellent corrosion resistance. However, a result of a corrosion resistance test on a mechanical device using such the alloy member has suggested that further higher corrosion resistance is expected under severe conditions such as in a highly concentrated acid environment.

The inventors of the present invention then studied and made researches on relationships between the microstructures and various properties of the alloy member originating from the production method. The inventors consequently acknowledged that grain boundary corrosion occurs originating from deposition of hexagonal precipitates occurring in crystal grain boundaries after the heat treatment. With more studies, the inventors concluded that an amount of deposition of the hexagonal precipitates can be reduced by controlling a cooling rate after the heat treatment, and this allows the inventors to achieve the present invention. As used herein, the term "deposition of hexagonal precipitates" refers to an intermetallic compound including hexagonal precipitates generated as a stable phase in the alloy member (hereinafter, referred to as the deposition of hexagonal precipitates).

As above, a method for producing an alloy member according to the present invention basically includes: (1) an additive manufacturing step for forming products by additive manufacturing using an alloy powder including each of Co, Cr, Fe, Ni, and Ti in a range between 5 at % and 35 at %, Mo in a range of greater than 0 at % and 8 at % or less, and unavoidable impurities for the remainder; a heat treatment step for raising a temperature of the products through heating and holding the products at a temperature between 1080° C. and 1180° C.; and a forced cooling step for cooling the products after the heat treatment in a temperature range from a holding temperature to 800° C. at a cooling rate between 110° C./min and 2400° C./min. Such the forced cooling step can suppress generation of the deposition of hexagonal precipitates so that the alloy member can have higher corrosion resistance.

Also, the method can include an aging treatment step, in which the alloy member is applied with an aging treatment at a temperature ranging from 500° C. to less than 900° C., after the forced cooling step. That is, a method for producing an alloy member according to the present invention basically includes: (2) an additive manufacturing step for forming products by additive manufacturing using an alloy powder including each of Co, Cr, Fe, Ni, and Ti in a range between 5 at %, and 35 at %, Mo in a range of greater than 0 at % and 8 at % or less, and unavoidable impurities for the remainder; a heat treatment step for raising a temperature of the products through heating and holding the products at a temperature between 1080° C. and 1180° C.; a forced cooling step for cooling the products after the heat treatment in a temperature range from a holding temperature to 800° C. at a cooling rate between 110° C./min and 2400° C./min; and an aging treatment step for applying aging treatment to the products at a temperature ranging from 500° C. to less than 900° C. after the forced cooling step. Adding such the aging treatment step can promote deposition of nanoscopic scale micro precipitates and mainly improve the mechanical properties.

Following improvements and modifications may be applied to the above methods for producing the alloy member.

(3) The cooling rate in the forced cooling step may range from 110° C./min to less than 600° C./min. Within such the range of the cooling rate, cooling can be done inside a furnace using mainly high pressure gas. This enables the alloy member to progress to the cooling step inside an inert gas atmosphere in the furnace immediately after the heat treatment.

(4) The forced cooling step may use at least one of inert gases of nitrogen, argon, or helium, which are at the atmospheric pressure or higher. The gas cooling using such the inert gas enables cooling inside the furnace after the heat treatment, and this can prevent deterioration of the alloy member due to surface oxidation or the like.

(5) The cooling rate in the forced cooling step may range between 600° C./min and 2400° C./min. Within such the range of the cooling rate, cooling can be done in an immersion bath using mainly a liquid, and the cooling step can be performed adjusting immersion time after the heat treatment.

(6) The forced cooling step may use any one of liquids of salt bath, quenching oil, and polymer aqueous solution. By immersion cooling using such the liquid, the cooling rate can be higher than the cooling rate in the gas cooling using the inert gas. This enables to cool down entirety of the alloy member with a large size and heat capacity at the faster cooling rate with more certainty.

(7) In the heat treatment step, a heating rate of the heating process between 800° C. and 1080° C. may be 5° C./min or more. Such the heating rate can suppress generation of the deposition of hexagonal precipitates in the heating step, further ensuring suppression of an amount of deposition of hexagonal precipitates after the heat treatment.

(8) A laser beam or an electron beam may be used as a heat source for additive manufacturing in the additive manufacturing step. This enables additive manufacturing to be performed in vacuum, which can reduce contamination of the alloy member by impurities such as oxygen or nitrogen in the atmosphere.

(9) When using the above immersion cooling, the heat treatment may also be carried out in the liquid. That is, a method for producing an alloy member of the present invention includes an additive manufacturing step for forming products by additive manufacturing using an alloy powder including each of Co, Cr, Fe, Ni, and Ti in a range between 5 at % and 35 at %, Mo in a range of greater than 0 at % and 8 at % or less, and unavoidable impurities for the remainder; a heat treatment step for raising a temperature of the products through heating and holding the products in a liquid at a temperature between 1080° C. and 1180° C.; and a forced cooling step for cooling the products after the heat treatment in which the products is immersed in the liquid in a temperature range from the holding temperature to 800° C. at a cooling rate between 600° C./min and 2400° C./min. The liquid used in the heat treatment step is any one type of liquids of salt bath, quenching oil, and polymer aqueous solution.

Also, an alloy member according to the present invention includes:

(10) each of Co, Cr, Fe, Ni, and Ti in a range between 5 at % and 35 at %, Mo in a range of greater than 0 at % and 8 at % or less, and unavoidable impurities for the remainder, where a grain morphology of a parent phase is an equiaxed system, minute precipitates having an average diameter of 100 nm or less are deposited and dispersed among crystal grains of the parent phase, and deposition of hexagonal precipitates in crystal grain boundaries of the parent phase is less than 1 vol %.

Following improvements and modifications may be made to the above alloy member.

(11) The crystal structure of the parent phase may include at least one of a face-centered-cubic structure or a simple cubic structure. Such the crystal structure has excellent deformability, which is effective in giving ductility necessary for matrix.

(12) It is preferable that the alloy member has tensile strength of 1100 MPa or more, elongation at break of 10% or more, and a corrosion rate in 10% boiling sulfuric acid of 5 mm/year or less. An upper limit of the tensile strength is not particularly limited and the tensile strength may be 1500 MPa or more, for example. Also, an upper limit of the elongation at break is not particularly limited, and the elongation at break may be 30% or more, for example. Corrosion resistance is excellent compared with conventional alloys and can exert ten times higher corrosion resistance, for example. As above, the alloy member according to the present invention has excellent mechanical properties and ductility and further higher corrosion resistance in severe environments.

Hereinafter, preferable embodiments of the present invention will be described following a procedure of a production method with reference to the accompanying drawings. The present invention is, however, not limited to the embodiments described herein, and combinations of and modifications to the embodiments are possible within the scope of the technical idea of the present invention.

<Alloy Member Production Method>

FIG. 1 is a process drawing illustrating a method for producing an alloy member according to the present invention. The production method according to an embodiment of the present invention includes an additive manufacturing step, a heat treatment step, which may also be called as a pseudo-solution heat treatment in the present invention, and a forced cooling step. The embodiments of the present invention will be described further specifically by describing each step hereafter.

First, an alloy powder 20 including a desired HEA composition (Co—Cr—Fe—Ni—Ti—Mo) is prepared. The alloy powder 20 to be used can be obtained by an atomizing method, for example. The method for atomization is not particularly limited and a conventional method can be used. Preferable examples are: gas atomization including, but not limited to, vacuum gas atomization and electrode induction melting gas atomization; rotary atomization including, but not limited to, disc atomization and plasma rotary electrode atomization; and plasma atomization.

(Chemical Composition)

The HEA composition of the present invention includes each of five elements of Co, Cr, Fe, Ni, and Ti in a range between 5 at % and 35 at % as major components, Mo in a range of greater than 0 at % and 8 at % or less as a sub-component, and unavoidable impurities for the remainder.

The above composition may include Co in a range between 20 at % and 35 at %, Cr in a range between 10 at % and 25 at %, Fe in a range between 10 at % and 25 at %, Ni in a range between 15 at % and 30 at %, and Ti in a range between 5 at % and 15 at %.

The above composition may include Co in a range between 25 at % and 33 at %, Cr in a range between 15 at % and 23 at %, Fe in a range between 15 at % and 23 at %, Ni in a range between 17 at % and 28 at %, Ti in a range between 5 at % and 10 at %, and Mo in a range between 1 at % and 7 at %.

The above composition may include Co in a range of 25 at % or more and less than 30 at %, Cr in a range of 15 at % or more and less than 20 at %, Fe in a range of 15 at % or more and less than 20 at %, Ni in a range between 23 at % and 28 at %, Ti in a range between 7 at % and 10 at %, and Mo in a range between 1 at % and 7 at %.

The above composition may include Co in a range between 30 at % and 33 at %, Cr in a range between 20 at % and 23 at %, Fe in a range between 20 at % and 23 at %, Ni in a range of 17 at % or more and less than 23 at %, Ti in a range of 5 at % or more and less than 7 at %, and Mo in a range between 1 at % and 3 at %.

Controlling the composition within such ranges can improve both ductility and mechanical strength. In other words, it is difficult to achieve preferable properties if each component lies outside the respective preferable component range.

To prioritize improvement on the mechanical strength, the above composition more preferably includes Co in a rang of 25 at % or more and less than 30 at %, Cr in a range of 15 at % or more and less than 20 at %, Fe in a range of 15 at % or more and less than 20 at %, Ni in a range between 23 at % and 28 at %, Ti in a range between 7 at % and 10 at %, and Mo in a range between 1 at % and 7 at %.

Also, to prioritize improvement on the ductility, the above composition more preferably includes Co in a range between 30 at % and 33 at %, Cr in a range between 20 at % and 23 at %, Fe in a range between 20 at % and 23 at %, Ni in a range of 17 at % or more and less than 23 at %, Ti in a range of 5 at % or more and less than 7 at %, and Mo in a range between 1 at % and 3 at %.

(Powder Diameter)

An average diameter of the alloy powder 20 is preferably in a range between 10 μm and 200 μm in a view of handling and filling abilities (the same applies hereafter). Also, the preferable average diameter depends on a method used in additive manufacturing: the preferable average diameter for a selective laser melting (SLM) method is between 10 μm and 50 μm; and the preferable average diameter for an electron beam melting (EMB) method is between 45 μm and 105 μm. Also, for a laser metal deposition (LMD) method, the preferable average diameter is between 50 μm and 150 μm. If the average diameter is less than 10 μm, the alloy powder 20 may likely to be blown up in the following additive manufacturing step, and this may deteriorate forming accuracy of an alloy product fabricated by additive manufacturing. On the other hand, the average diameter that is greater than 200 μm may cause an increase in surface roughness of the product or insufficient melting of the alloy powders 20 in the following additive manufacturing step.

[Additive Manufacturing Step]

Next, an additive manufacturing step is applied to form an alloy product fabricated by additive manufacturing (hereinafter, simply called as products) 101, having a desired shape, by metal powder additive manufacturing (hereinafter, simply called as additive manufacturing) using the alloy powder 20 prepared above. With an application of additive manufacturing in which a near net shape alloy member is formed by not sintering but fusion and solidifying (called as fusion and solidification), it is possible to produce products having a complex three-dimensional shape with hardness that is equivalent to that of a forged material. As additive manufacturing, a metal powder additive manufacturing using the SLM method, the EMB method, or the LMD method may be suitably used.

Figure 2:
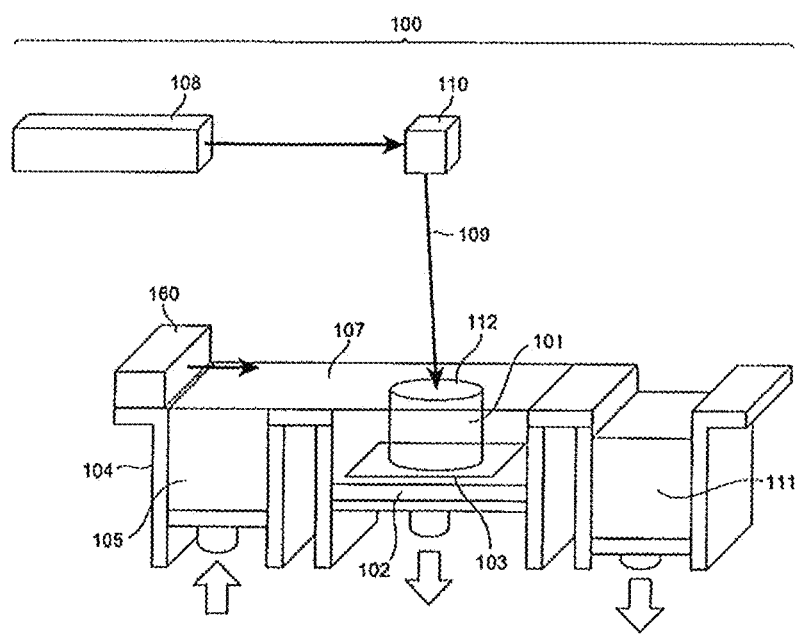
FIG. 2 is a schematic view illustrating examples of a structure of an additive manufacturing device and an additive manufacturing method using a selective laser melting method.

Hereinafter, an additive manufacturing step using the SLM method will be described. FIG. 2 is a schematic view showing a structure of an SLM powder additive manufacturing device 100. A stage 102 is lowered down by a thickness of one layer (e.g., approximately 20-50 μm) of product 101, which is to be produced by additive manufacturing. Alloy powders 105 are fed from a powder feed container 104 onto a base plate 103, which is on a top face of the stage 102. A recoarter 160 then spreads and flattens out the alloy powders 105, thereby forming a powder bed 107 (a layer of powders).

Next, based on 2D slice data converted from 3D-CAD data for the product 101 to be produced, a laser oscillator 108 irradiates a laser beam 109 onto the un-molten powders on the base plate 103 through a galvanometer mirror 110, forming a micro molten pool. Then, the micro molten pool is moved and fusion melted and solidified each time to form a 2D slice-shaped solidified layer 112. The container for collecting un-molten powder 111 collects the un-molten powders. Adding layers by repeating such operations produces the product 101.

When the product 101 is produced, the product 101 is integrated with the base plate 103 and is covered by the un-molten powders. After completion of the irradiation of the laser beam and when the powders and the product 101 are cooled down sufficiently, the un-molten powders are collected, and then the product 101 and the base plate 103 are taken out from the powder additive manufacturing device 100. The product 101 is then cut off from the base plate 103 to obtain the product 101.

Here, a sample for observing a microstructure is taken from the products 101 after taking out. The microstructure of the sample is then observed under an electron microscope. The result shows that a parent phase of the products 101 has a structure of micro columnar crystal grains (an average width of 50 μm or less) standing close together along a building direction of the products 101 (so called rapid solidification structure).

[Heat Treatment Step]

Figure 3:
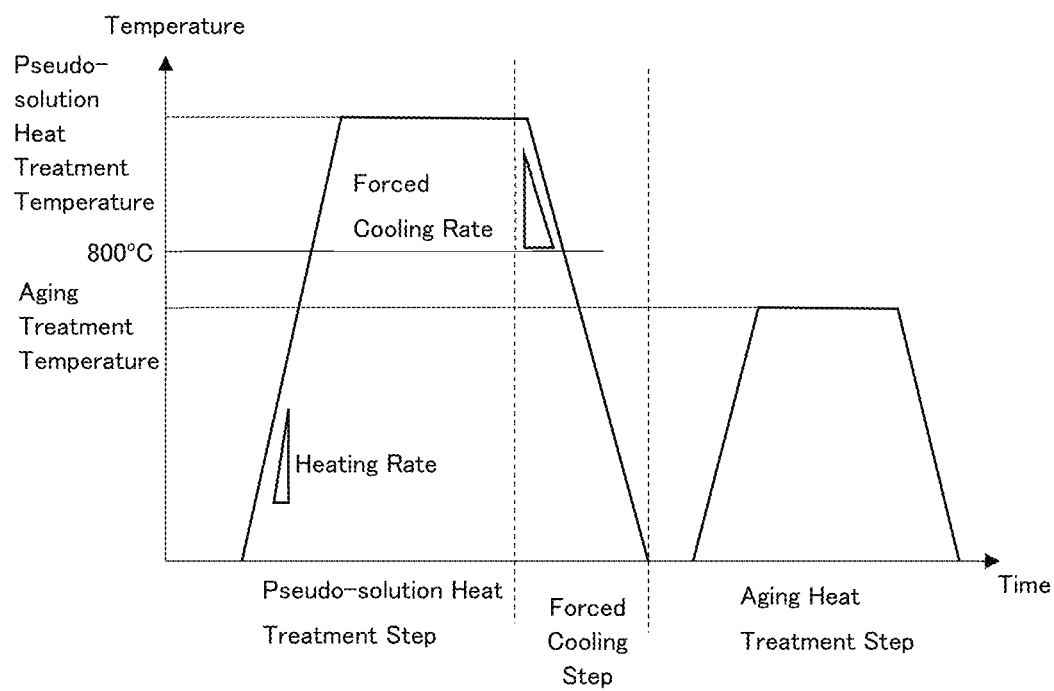
FIG. 3 is a process drawing illustrating an example of a flow of a heat treatment step, a forced cooling step, and an aging treatment step, which follows the additive manufacturing.

As shown in FIG. 3, a heat treatment step for raising a temperature of the above product 101 through heating and holding the product 101 at a maximum temperature (a holding temperature) for a predetermined time is carried out. A range of the holding temperature in the heat treatment step is between 1080° C. and 1180° C. Preferably, the range of the holding temperature is between 1100° C. and 1140° C. At a temperature below 1080° C., deposition of hexagonal precipitates is likely to deposit and remain. Also, at a temperature exceeding 1180° C., defects such as coarsening of crystal grain diameters or partial melting are likely to occur. A holding time at the maximum temperature is to be set preferably between 0.5 hours and 24 hours, and more preferably between 0.5 hours and 8 hours. If the holding time is 0.5 hours or more, generation of deposition of hexagonal precipitates within the products 101 can be suppressed. If the holding time is 24 hours or less, coarsening of the grain diameters can be suppressed.

Also, in the temperature raising process in the heat treatment step, for a temperature range in which deposition of hexagonal precipitates is likely to occur (between 800° C. and 1080° C., for example), it is suitable to quickly raise the temperature at a heating rate of 5° C./min or more, for example, so that an amount of deposition of hexagonal precipitates can be reduced before the heat treatment. The heating rate is more preferably 10° C./min or more. Although not particularly limited, an upper limit for the heating rate is approximately 1000° C./min in a view of ensuring temperature uniformity within the product 101, particularly for prevention of having an excessively heated part. In the present application, since a solid solubility limit of the alloy is unclear and minute precipitates having the average grain diameter of 100 nm or less are deposited and dispersed in the alloy member, which is an end product, the above heat treatment can be called as a pseudo-solution heat treatment.

[Forced Cooling Step]

Next, a forced cooling step is performed onto the products after the heat treatment step. The forced cooling step is for forcibly cooling the products at least in a temperature range from the holding temperature in the heat treatment to 800° C. at a cooling rate between 110° C./min and 2400° C./min. Here, the forced cooling means cooling in which the cooling rate is controlled within a range that is faster than conventional air-cooling and slower than water-cooling. On a slower side of the forced cooling rate, the cooling rate can be 110° C./min or more and less than 600° C./min, or more preferably 200° C./min or more and less than 600° C./min. On a faster side of the forced cooling rate, the cooling rate can be between 600° C./min and 2400° C./min, or more preferably between 1000° C./min and 2000° C./min. At a cooling rate less than 110° C./min (furnace cooling or air-cooling process, for example), deposition of hexagonal precipitates is likely to occur in grain boundaries causing an issue of deterioration in corrosion resistance. Also, at the cooling rate more than 2400° C. (immersion cooling in a water tank, for example), there is an issue of deformation of the products due to temperature irregularities occurred during the rapid cooling. In addition, it is preferable to continue the forced cooling after the temperature reaches 800° C. or less. For example, cooling down at the above cooling rate in a range between 800° C. and a room temperature is preferable.

To achieve such the forced cooling, a high pressure gas cooling method using at least one of inert gases of nitrogen, argon, or helium, which are at a pressure higher than the atmospheric pressure, may be used for the slower side cooling. For the faster side cooling, an immersion cooling method using any one of liquids of salt bath, quenching oil, and polymer aqueous solution may be applied. Such methods will be described specifically hereafter.

(High Pressure Gas Cooling)

The high pressure gas cooling can perform cooling with the cooling rate in a range of 110° C./min or more and less than 600° C./min. For example, after the above heat treatment step, a high pressure gas is introduced into a heat treatment furnace and blown toward the product 101; the high pressure gas is kept blowing until the temperature inside the furnace is cooled down to at least 800° C.; and then the high pressure gas feed is stopped when the temperature reaches a predetermined temperature selected from a temperature range between the room temperature and 800° C. At this time, as a way of rapid cooling, heating and cooling can be performed in separate rooms by using a double-room heat treatment furnace. Also, in a production site, it is preferable to keep cooling down by introducing the high pressure gas for a set time that is determined based on data obtained empirically. Preferably, the high pressure gas is kept flowing after the furnace temperature reaches the predetermined temperature so that the temperature of the products 101 is lower than the predetermined temperature. Here, the high pressure gas is a gas having a pressure that is equal to or higher than the atmospheric pressure, or more preferably 0.2 MPa or higher. Although it is not particularly limited, an upper limit of the pressure may be 1.0 MPa or less, for example, for safety of a furnace body and to conform to the related laws and regulations. Also, as an inert gas, it is preferable to use nitrogen gas in a view of cost and availability. Alternatively, a rare gas such as argon or helium can also be used for a purpose of prevention of discoloration due to surface nitriding.

(Immersion Cooling)

The immersion cooling can achieve cooling with the cooling rate in a range between 600° C./min and 2400° C./min. For example, an immersion bath tab with a liquid at a predetermined temperature selected from the temperature range between the room temperature and 800° C. is disposed in proximity of the heat treatment furnace in advance. The immersion bath tab is a pool-like bath tab or a bath tab with a cooling device, for example. An immersion liquid such as molten salt, quenching oil, or polymer solution, which is selected mainly to suit the predetermined temperature of the immersion bath, is used. After the above-mentioned heat treatment step, the product 101 is moved from the heat treatment furnace into the immersion bath tab to be cooled down by immersion. In the production site, it is preferable to keep cooling down for a set time that is determined based on data obtained empirically. To make sure that the object is cooled down to proximity of the predetermined temperature, an immersion time is preferably longer than a time required in the heat treatment step, and the immersion time may be an hour or more, for example. Also, in a view of ensuring productivity, the immersion time is preferably 24 hours or less.

(Deposition of Hexagonal Precipitates)

In the present invention, the above-mentioned high pressure gas cooling and the immersion cooling are collectively called as the forced cooling step. Having such the forced cooling step can suppress generation of deposition of hexagonal precipitates occurring preferentially in grain boundaries. This makes it possible to form microstructures in which nanoscopic scale minute precipitates are deposited and dispersed in the parent phase crystals, and, at the same time, to obtain an alloy member in which the generation of deposition of hexagonal precipitates is suppressed to 1 vol % or less. Here, a volume percent (vol %) of deposition of hexagonal precipitates is preferably found by a cross-sectional shape evaluation of the product 101. For example, after mirror polishing a cross section of the product 101 using abrasive paper or buff polishing, a method such as electrolytic etching is applied in a nitric-hydrochloric acid etchant or an oxalate solution so that the deposition of hexagonal precipitates having a length of 1 μm or more appears on the cross section, which is then observed under an optical microscope or a scanning electron microscope to obtain a cross-sectional image of approximately 500 magnifications, for example. Such the deposition of hexagonal precipitates has a feature of depositing in a long plate shape. Thus, an area ratio of the deposition having a long side of 1 μm or more on the cross-sectional image can be taken as the volume percent of the deposition of hexagonal precipitates. The area ratio can be found by, for example, dividing an area of the deposition on a region of 200 μm×200 μm by an area of the observed section (4000 μm$^2$).

(Micro Precipitates)

Also, the average diameter of the minute precipitates deposited and dispersed among crystal grains of the parent phase is preferably 100 nm or less, and more preferably between 20 nm and 80 nm. When the average diameter of the minute precipitates is between 20 nm and 80 nm, ductility and mechanical strength (tensile strength, and the like) are excellent and, at the same time, corrosion resistance can be improved. If the average diameter of the minute precipitates is greater than 100 nm, it is known that ductility deteriorates drastically. For minute precipitates, an image including minute precipitates is obtained by a high-magnification observing means represented by a transmission electron microscope method or a high resolution scanning microscope method, and an average value of a diameter of an inscribed circle and a diameter of a circumscribed circle of the minute grain is taken as a grain diameter of the minute grain, and an average value of grain diameters of 20 minute precipitates is used as the average diameter.

[Aging Treatment Step]

For a purpose of improving strength of the products, an aging treatment step can be applied. In the aging treatment step, the product is kept at a temperature in a range where the minute precipitates can easily increase: the temperature range may be 500° C. or higher and lower than 900° C., for example, and more preferably between 600° C. and 800° C. If the aging treatment temperature is lower than 500° C., improving effects on the strength is unstable. Also, the aging treatment temperature of 900° C. or higher is inappropriate since the deposition of hexagonal precipitates occurs again and this may deteriorate ductility. The holding time is set preferably between 0.5 hours and 24 hours, and more preferably between 0.5 hours and 8 hours. The holding time of 0.5 hours or more can give improving effects in strength, and the holding time of 24 hours or less can suppress a repeat of occurrence of the deposition of hexagonal precipitates. Such aging treatment can increase the nanoscopic scale minute precipitates in the products after the heat treatment and improve strength of the products. The cooling step following the aging treatment is not particularly limited. However, the nanoscopic scale minute precipitates may be generated excessively if the product is kept at proximity of the aging treatment temperature for a long time. Thus, it is preferable that the product is cooled down to the room temperature by air-cooling or by using the same cooling method used in the above-mentioned forced cooling step.

Also, various alterations can be made to a heat treatment pattern. For example, the aging treatment step can be performed consecutively after the above-mentioned forced cooling step. In such the case, a goal temperature in the forced cooling step is determined (700° C. for example) and this temperature is set as the aging treatment temperature, so that the aging treatment step for holding for the predetermined time starts at the time at which the goal temperature is reached and then the forced cooling can cool down the product to the room temperature.

<Microstructures of the Alloy Member>

Figure 4:
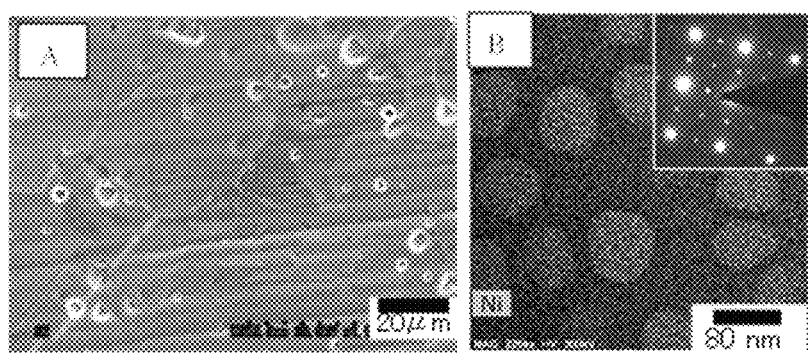
FIGS. 4A and 4B show an example of a microstructure of the alloy member according to the present invention.

FIG. 4A and FIG. 4B show an example of a microstructure of an alloy member of a working example (high pressure nitrogen gas cooler: M1-SHN), which will be described below. FIG. 4A is an image under a scanning electron microscope (SEM image, 1,000 magnifications), and FIG. 4B is an image under a scanning transmission electron microscope (STEM image, 225,000 magnifications). The alloy member of the present invention has a parent phase crystal structure including mainly equiaxed crystal grains having crystal grain diameters between 50 μm and 150 μm (the average crystal grain diameter of 100 μm or less), where minute precipitates with an average grain diameter of 100 nm or less are deposited and dispersed in the parent phase crystal grains (see FIG. 4B) and deposition of hexagonal precipitates occurring in grain boundaries of the parent phase crystal grains is less than 1 vol %. In FIG. 4B, a diffraction pattern corresponding to the highly magnified high angle annular dark field (HAADF) image of the STEM image shows a satellite pattern originated from a minute regular phase found in the product applied with the heat treatment, and it is found that the minute precipitates correspond to the regular phase that is commensurate with the parent phase. Also, in an element-mapping image by STEM-EDX, the average grain diameter of minute precipitates of concentrated Ni and Ti is approximately 60 nm. The SEM image in FIG. 4A is obtained from a test piece after a boiling sulfuric acid test. Although there are some etching traces in crystal grain boundary parts, there is no corrosion originated from the deposition of hexagonal precipitates seen in the image, showing that corrosion under the severe corrosion environment is suppressed.

Figure 5:
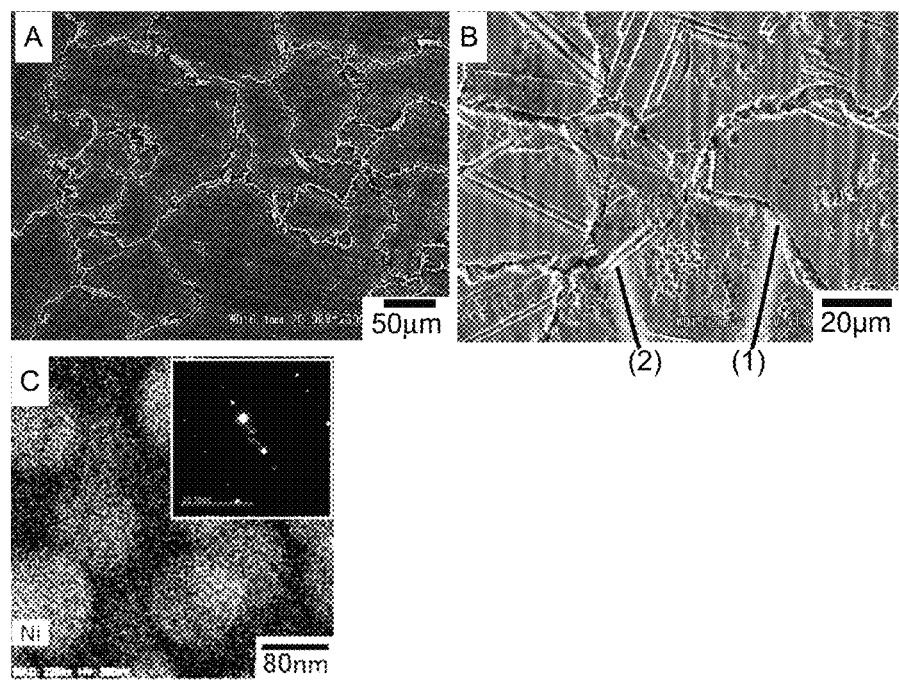
FIGS. 5A to 5C show an example of a microstructure of an alloy member of a comparative example.

FIG. 5A through FIG. 5C, on the other hand, show an example of a microstructure of an alloy member according to a comparative example (low-pressure gas cooler: M1-SLN), where FIGS. 5A and 5B are images observed under the scanning electron microscope (SEM image, 300 magnifications and 1,000 magnifications, respectively), and FIG. 5C is an image under the scanning transmission electron microscope (STEM image, 225,000 magnifications). Similarly to FIGS. 4A and 4B, FIGS. 5A to 5C also show external appearance of a test piece after boiling sulfuric acid test. Although the alloy member also has a parent phase grain morphology including mainly equiaxed crystal grains having crystal grain diameters between 50 μm and 150 μm (the average crystal grain diameter of 100 μm or less), plate-shaped hexagonal precipitates are deposited in grain boundaries of the parent phase crystal grains as shown in FIG. 5A, and an amount of the deposition is more than 1 vol %. For this reason, the alloy member suffers grain boundary corrosion originated from the deposition of hexagonal precipitates occurred in the grain boundaries of the parent phase crystal grains in the boiling sulfuric acid test as shown in FIG. 5B. FIG. 5B is an image after the boiling sulfuric acid test and there is no deposition of hexagonal precipitates seen in the image. However, crevice parts running along curves (notation 1) in FIG. 5B are grain boundary corrosion parts in the grain boundaries generated by melting and originating from the deposition of hexagonal precipitates; and straight crevice parts (notation 2) in FIG. 5B are corrosion parts originated from the plate-shaped deposition of hexagonal precipitates that is originated from the grain boundaries and grown into the grains. In FIG. 5C, a diffraction pattern corresponding to the highly magnified HAADF image of the STEM image shows, unlike in FIG. 4B, a satellite pattern corresponding to the deposition of hexagonal crystal system, and it is confirmed that observed parts include the deposition of hexagonal precipitates.

Working Examples

Hereinafter, the present invention will be described specifically with working examples and comparative examples. Note that the present invention is not limited to such working examples.

Experiment 1

(Production of HEA Powders P1 and P2)

Ingredients are mixed with nominal compositions shown in Table 1, and alloy powders are produced from molten metal using vacuum gas atomization. Next, the obtained alloy powders are sifted to be classified so that powders having diameters between 10 μm and 53 μm with an average diameter (d50) of approximately 35 μm are selected to prepare HEA powders P1 and P2. The compositions of P1 and P2 are chosen because the inventors found from preparatory examinations that such the compositions excel in mechanical properties, particularly in relation to strength and ductility.

TABLE 1

| HEA Powders | Nominal Compositions of HEA Powders P1 and P2 (unit: at %) | | | | | |
|---|---|---|---|---|---|---|
| | Co | Cr | Fe | Ni | Ti | Mo |
| P1 | 26.7 | 17.9 | 17.9 | 26.8 | 8.9 | 1.8 |
| P2 | 28.0 | 19.7 | 17.6 | 23.4 | 8.9 | 2.4 |

Experiment 2

(Production of Alloy Members M1 (M2), M1 (M2)-SA, M1 (M2)-SW, M1 (M2)-SLN, M1 (M2)-SHN, M1 (M2)-SS))

Product M1 (an alloy product fabricated by additive manufacturing: a square column material of 25 mm×25 mm×70 mm height, where a height direction is a building direction) is produced by additive manufacturing from the HEA powder P1 prepared in Experiment 1 according to the additive manufacturing step in the SLM method using a powder additive manufacturing device (EOS M290 made by EOS) shown in FIG. 2. A laser output at the time of additive manufacturing is set at 300 W based on preparatory examinations by the inventor, and a laser scanning rate is set at 1000 mm/sec with a scanning interval of 0.11 mm. Also, a thickness of each layer is set at approximately 0.04 mm.

After the additive manufacturing step, the product M1 is taken out. Then, the product M1 undergoes various heat treatments and forced cooling to produce an alloy member treated under various heat treatments. Heat treatment conditions are fixed so that a holding temperature is 1120° C. and a holding time is one hour. The cooling step is carried out as follows.

First, an air furnace is used for the heat treatment. After holding at 1120° C., a sample piece is then placed on a ceramics plate outside the furnace and cooled by air-cooling (left to be cooled by radiational cooling) to prepare a sample M1-SA; and another sample piece is immersed in purified water to be cooled by water-cooling after holding at 1120° C. to prepare a sample M1-SW.

On the other hand, using a vacuum furnace for the heat treatment, after holding at 1120° C., a sample piece is cooled by using atmospheric pressure nitrogen gas which is set at 0.1 MPa to prepare a sample M1-SLN; and another sample piece is cooled by using high pressure nitrogen gas which is set at 0.5 MPa to prepare a sample M1-SHN (a working example).

Also, using a salt bath furnace for the heat treatment, a sample piece is cooled by salt-bath cooling, in which the sample piece is transferred, after being held at 1120° C., into a low temperature salt bath at 180° C. and held for two hours, to prepare a sample M1-SS (a working example).

Furthermore, similarly to the above, the HEA powders P2 undergo the additive manufacturing step, the taking out step, the heat treatment step, and the various forced cooling step to fabricate products M2, M2-SA, M2-SW, M2-SLN, M2-SHN, and M2-SS.

The table 2 shows the above-mentioned heat treatment conditions in the heat treatment step, and forced cooling conditions and cooling rates calculated from corresponding temperature measurements in the forced cooling step.

TABLE 2

| Alloy Member | Conditions for Heat Treatment | Conditions for Forced Cooling | Cooling Rate |
|---|---|---|---|
| M1 (M2) | None | None | — |
| M1-SA (M2-SA) | Air Furnace (1120° C., 1 hour) | Air Cooling | 100° C./min. |
| M1-SW (M2-SW) | Air Furnace (1120° C., 1 hour) | Water Cooling | 2500° C./min. |
| M1-SLN (M2-SLN) | Vacuum Furnace (1120° C., 1 hour) | Low Pressure Nitrogen Gas Cooling (0.1 MPa) | 30° C./min. |
| M1-SHN (M2-SHN) | Vacuum Furnace (1120° C., 1 hour) | High Pressure Nitrogen Gas Cooling (0.5 MPa) | 150° C./min. |
| M1-SS (M2-SS) | High Temperature Salt Bath (1120° C., 1 hour) | Low Temperature Salt Bath (held at 180° C. for 2 hours) | 1500° C./min. |

(Production of Aging Treated Alloy Members M1-SHN-A, M1-SS-A, M2-SHN-A, M2-SS-A)

With an intention of controlling the amount of deposition and shapes of the minute precipitates that are deposited and dispersed in the parent phase crystals, the alloy member M1-SHN prepared in Experiment 2 (high pressure nitrogen gas cooler) further undergoes an aging treatment (held for one hour at 500° C., 600° C., 700° C., 800° C., and 900° C., respectively, in the atmosphere, and then air-cooled) to prepare alloy members M1-SHN-A500, M1-SHN-A600, M1-SHN-A700, M1-SHN-A800, and M1-SHN-A900.

Similarly, the alloy member M1-SS (salt bath cooler), M2-SS (salt bath cooler), and M2-SHN (high pressure nitrogen gas cooler) prepared in Experiment 2 also undergo the same aging treatment as above. In this way, the alloy members that are treated with various aging treatments are obtained.

Experiment 3

(Observing Microstructures of Alloy Members)

Test pieces for observing the microstructures are taken from the various alloy members that are produced as above, and the microstructures are observed under an optical microscope and various electron microscopes (SEM, STEM, STEM-EDX) by using the above-mentioned methods. An observation under SEM is performed with magnifications ranging from 300 to 1000 to suit the size of the crystal grains. Also, similarly, an observation under STEM is performed with magnifications of 100,000 or more to suit the size of minute precipitates among the grains. Specifications of fabrication and results of the observations of the microstructure are shown in Table 3. Although not shown in the table, in all the test pieces, the crystal structure found by XRD measurement is a mixture of simple cubic crystals (SC) and face-centered-cubic crystals (FCC). Also, an amount of deposition of grain boundaries is marked as "<0.1%" when deposition of grain boundaries having a long side of 1 μm or more is not seen.

TABLE 3

| Alloy Member | Powder | Rapid Cooling Method | Aging Treatment | Minute Precipitates Diameter in Grains (nm) | Amount of Deposition of Grain Boundaries (vol %) |
|---|---|---|---|---|---|
| M1 | P1 | None | None | — | 0 |
| M1-SA | | Air Cooling | | 70 | 1.5 |
| M1-SW | | Water Cooling | | 20 | <0.1 |
| M1-SLN | | Low Pressure Nitrogen Gas Cooling | | 120 | 3.0 |
| M1-SHN | | High Pressure Nitrogen Gas Cooling | | 60 | 0.3 |
| M1-SHN-A500 | | | 500° C. 1 hour | 60 | 0.3 |
| M1-SHN-A600 | | | 600° C. 1 hour | 60 | 0.3 |
| M1-SHN-A700 | | | 700° C. 1 hour | 60 | 0.3 |
| M1-SHN-A800 | | | 800° C. 1 hour | 80 | 0.5 |
| M1-SHN-A900 | | | 900° C. 1 hour | 105 | 3.5 |
| M1-SS | | Salt Bath Cooling | None | 30 | <0.1 |
| M1-SS-A500 | | | 500° C. 1 hour | 30 | <0.1 |
| M1-SS-A600 | | | 600° C. 1 hour | 30 | <0.1 |
| M1-SS-A700 | | | 700° C. 1 hour | 50 | <0.1 |
| M1-SS-A800 | | | 800° C. 1 hour | 80 | 0.5 |
| M1-SS-A900 | | | 900° C. 1 hour | 105 | 3.0 |
| M2 | P2 | None | None | — | 0 |
| M2-SA | | Air Cooling | | 90 | 2.0 |
| M2-SW | | Water Cooling | | 30 | <0.1 |
| M2-SLN | | Low Pressure Nitrogen Gas Cooling | | 140 | 4.0 |
| M2-SHN | | High Pressure Nitrogen Gas Cooling | | 70 | 0.5 |
| M2-SHN-A500 | | | 500° C. 1 hour | 70 | 0.5 |
| M2-SHN-A600 | | | 600° C. 1 hour | 70 | 0.5 |
| M2-SHN-A700 | | | 700° C. 1 hour | 70 | 0.5 |
| M2-SHN-A800 | | | 800° C. 1 hour | 90 | 0.8 |
| M2-SHN-A900 | | | 900° C. 1 hour | 120 | 4.0 |
| M2-SS | | Salt Bath Cooling | None | 40 | <0.1 |
| M2-SS-A500 | | | 500° C. 1 hour | 40 | <0.1 |
| M2-SS-A600 | | | 600° C. 1 hour | 40 | <0.1 |
| M2-SS-A700 | | | 700° C. 1 hour | 60 | <0.1 |
| M2-SS-A800 | | | 800° C. 1 hour | 90 | 0.5 |
| M2-SS-A900 | | | 900° C. 1 hour | 120 | 4.0 |

As shown in Table 3, the parent phases of the alloy members M1 and M2 before the heat treatment have structures in which micro columnar crystal grains with the average grain diameter of 40 μm or less are standing close together along the building direction of the product fabricated by additive manufacturing (so called rapid solidification structure). The columnar crystal grain herein is defined as a crystal grain of which a ratio of a length of a long axis to a length of a short axis of a crystal grain is 2 or more.

On the other hand, it is found that the parent phase structures of all the other alloy members than the alloy members M1 and M2 after the forced cooling are formed of equiaxed grains, which are different from the above-mentioned columnar grains and are grains in polygonal shapes without anisotropy. It is also found, by observing under TEM and STEM-EDX, that there are minute precipitates with the average diameter of 100 nm or less deposited and dispersed in crystal grains of the parent phases. Furthermore, it is found that concentration of the Ni component and the Ti component in the minute precipitates is higher than in the parent phase crystals. There is a correlation between the diameters of such the minute precipitates and the cooling rates after the heat treatment: the diameter tends to decrease in water-cooling or salt-bath cooling where the cooling rate is fast, and the diameter tends to increase in air-cooling or low pressure nitrogen gas cooling where the cooling rate is slow. Also, for the samples applied with the aging treatments, the diameters of the minute precipitates increase as the aging treatment temperature rises, and, in particular, the diameters grow beyond 100 nm when the aging treatment temperature reaches 900° C.

It is also found by using STEM that there is grain boundary deposition of hexagonal precipitates having long sides of 1 μm or more occurring in the grain boundaries of the parent phase crystals of the alloy members other than the alloy members M1 and M1. Also, similarly to the above-mentioned minute precipitates, it is found that concentration of the Ni component and the Ti component of such the grain boundary deposition is higher than in the parent phase crystals. There is also a correlation between the amount of deposition of such the grain boundary deposition and the cooling rates after the heat treatment: the amount of deposition tends to decrease in water-cooling or salt-bath cooling where the cooling rate is fast, and the amount of deposition tends to increase in air-cooling or low pressure nitrogen gas cooling where the cooling rate is slow. Also, for the samples applied with the aging treatments, the amount of deposition of the grain boundary deposition increases as the aging treatment temperature rises, and, in particular, the volume percent of the grain boundary deposition with the long side length of 1 µm or more results in 3% or more when the aging treatment temperature reaches 900° C.

Experiment 4

(Measuring Mechanical Properties and Corrosion Resistance of Alloy Members)

A test piece for tensile test (diameter of a parallel part: 4 mm, length of the parallel part: 13 mm) is taken from each of the alloy members fabricated as above. The test pieces of the products and the alloy members after the heat treatment are taken so that a longitudinal direction of the test piece is the same as the building direction of additive manufacturing.

Each of the test pieces undergoes a room-temperature tensile test (in accordance with JIS Z 2241, strain rate: $5 \times 10^{-5} s^{-1}$) using a universal material testing machine to measure tensile strength and elongation at break. Five measurements are taken for the tensile test, and an average value of the three measurements excluding the maximum value and the minimum value out of the five measurements is calculated to be the result of the test. Evaluation for tensile strength is "pass" when tensile strength is 1100 MPa or more, and "fail" when tensile strength is less than 1100 MPa. Evaluation for elongation at break is "pass" when elongation at break is 10% or more, and "fail" when elongation at break is less than 10%. The results are shown in Table 4.

For reference, a conventional arc-melting material has mechanical properties of only approximately 775 MPa tensile strength and 3% elongation.

Also, a test piece for immersion test in boiling sulfuric acid (length: 25 mm, width: 25 mm, thickness: 2 mm) is taken from each of the alloy members fabricated as above. The boiling sulfuric acid immersion test is performed additionally to members that are used in a strong acid atmosphere, such as in resource mining environments and chemical plants, for evaluating higher corrosion resistance. Conditions for the immersion test are as follows: a testing area for each test piece: 14.5 $cm^2$, a test tool: glass-made flask (volume: 1,000 ml) connected with a glass-made reflux water-cooling condenser, a testing solution: 10% sulfuric acid solution (approximately 10 ml per 1 $cm^2$ surface area of the test piece), testing temperature: boiling temperature.

An amount of weight decrease after immersion under the above conditions for 24 hours is found, and an index of a corrosion rate (mm/year) is found by using an alloy density (8.04 $g/cm^3$). Evaluation for corrosion resistance is "pass" when the corrosion rate in boiling sulfuric acid is 5 mm/year or less, and "fail" when the corrosion rate is more than 5 mm/year. Although cases in which the corrosion rate is more than 5 mm/year are evaluated here as "fail", such rates can still be provided for practical use under use environments of traditional technologies. Results of the above corrosion test are shown in Table 4.

TABLE 4

| Alloy Member | Mechanical Properties | | | | Corrosion Resistance 10% Boiling Sulfuric Acid | |
|---|---|---|---|---|---|---|
| | Tensile Strength (MPa) | Pass/Fail | Elongation after Break (%) | Pass/Fail | Corrosion Rate (mm/year) | Pass/Fail |
| M1 | 1210 | Pass | 22 | Pass | 10 | Fail |
| M1-SA | 1450 | Pass | 18 | Pass | 5.5 | Fail |
| M1-SW | 1320 | Pass | 29 (with quenching crack)* | Fail | 4.0 | Pass |
| M1-SLN | 1480 | Pass | 16 | Pass | 8.0 | Fail |
| M1-SHN | 1460 | Pass | 30 | Pass | 2.0 | Pass |
| M1-SHN-A500 | 1460 | Pass | 27 | Pass | 3.0 | Pass |
| M1-SHN-A600 | 1510 | Pass | 25 | Pass | 3.0 | Pass |
| M1-SHN-A700 | 1590 | Pass | 18 | Pass | 3.5 | Pass |
| M1-SHN-A800 | 1490 | Pass | 10 | Pass | 4.0 | Pass |
| M1-SHN-A900 | 1390 | Pass | 5 | Fail | 7.5 | Fail |
| M1-SS | 1360 | Pass | 32 | Pass | 4.5 | Pass |
| M1-SS-A500 | 1370 | Pass | 30 | Pass | 2.5 | Pass |
| M1-SS-A600 | 1420 | Pass | 28 | Pass | 1.5 | Pass |
| M1-SS-A700 | 1570 | Pass | 23 | Pass | 2.0 | Pass |
| M1-SS-A800 | 1470 | Pass | 13 | Pass | 3.5 | Pass |
| M1-SS-A900 | 1360 | Pass | 8 | Fail | 7.0 | Fail |
| M2 | 1330 | Pass | 25 | Pass | 8.0 | Fail |
| M2-SA | 1470 | Pass | 15 | Pass | 6.0 | Fail |
| M2-SW | 1390 | Pass | 28 (with quenching crack)* | Fail | 0.5 | Pass |
| M2-SLN | 1510 | Pass | 18 | Pass | 6.0 | Fail |
| M2-SHN | 1490 | Pass | 35 | Pass | 0.5 | Pass |
| M2-SHN-A500 | 1490 | Pass | 33 | Pass | 0.5 | Pass |
| M2-SHN-A600 | 1540 | Pass | 30 | Pass | 0.5 | Pass |
| M2-SHN-A700 | 1620 | Pass | 30 | Pass | 1.0 | Pass |

TABLE 4-continued

| Alloy Member | Mechanical Properties | | | | Corrosion Resistance 10% Boiling Sulfuric Acid | |
|---|---|---|---|---|---|---|
| | Tensile Strength (MPa) | Pass/Fail | Elongation after Break (%) | Pass/Fail | Corrosion Rate (mm/year) | Pass/Fail |
| M2-SHN-A800 | 1430 | Pass | 12 | Pass | 2.5 | Pass |
| M2-SHN-A900 | 1280 | Pass | 5 | Fail | 6.0 | Fail |
| M2-SS | 1410 | Pass | 32 | Pass | 0.5 | Pass |
| M2-SS-A500 | 1410 | Pass | 31 | Pass | 0.5 | Pass |
| M2-SS-A600 | 1490 | Pass | 30 | Pass | 0.5 | Pass |
| M2-SS-A700 | 1610 | Pass | 30 | Pass | 0.5 | Pass |
| M2-SS-A800 | 1480 | Pass | 15 | Pass | 2.0 | Pass |
| M2-SS-A900 | 1320 | Pass | 7 | Fail | 5.5 | Fail |

Figure 6:
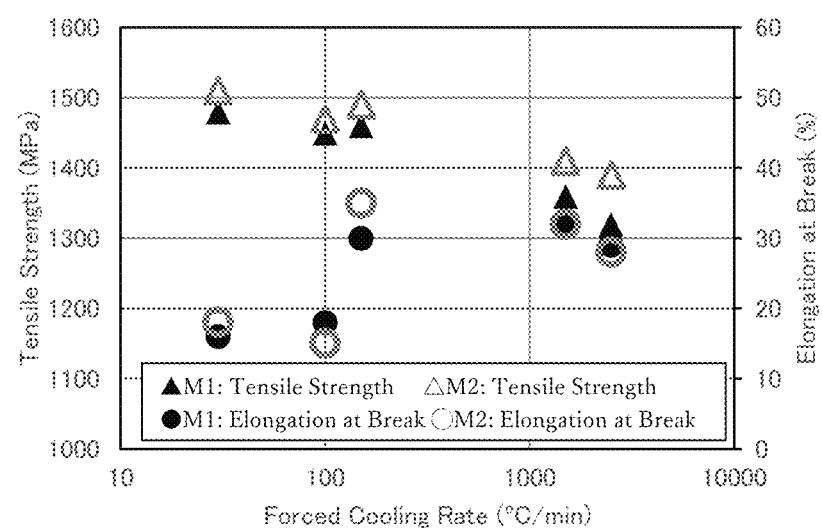
FIG. 6 is a chart showing a relationship among a forced cooling rate, tensile strength, and elongation at break of the alloy member according to the present invention.
Figure 7:
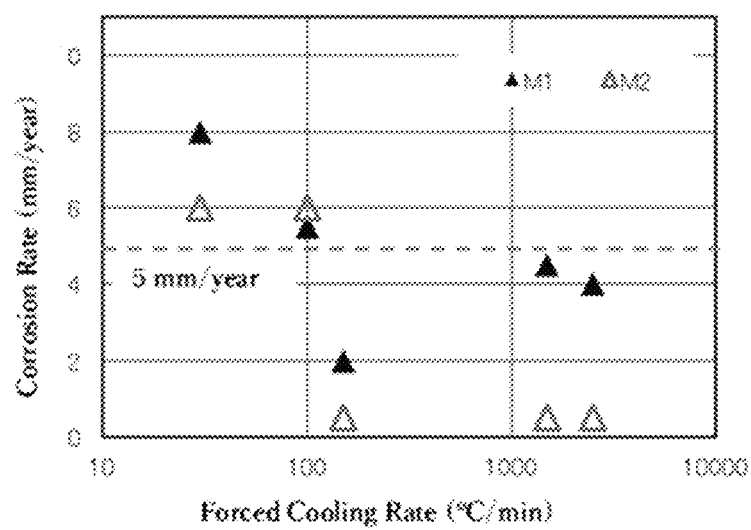
FIG. 7 is a chart showing a relationship between the forced cooling rate and a corrosion rate of the alloy member according to the present invention.
Figure 8:
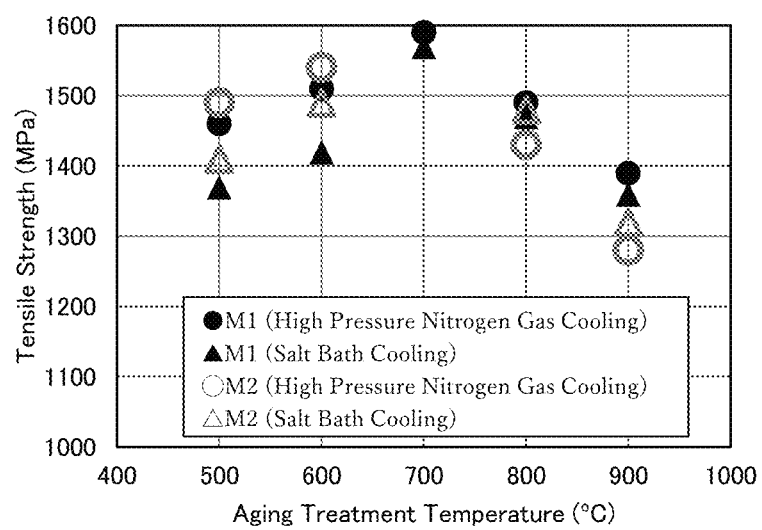
FIG. 8 is a chart showing a relationship between an aging treatment temperature and the tension strength of the alloy member according to the present invention.

Table 4 shows the evaluation results and pass/fail of the test pieces, and FIG. 6 to FIG. 8 show relationships between the cooling rates after the heat treatment, the aging treatment conditions, and properties. First, the alloy members M1 and M2, which are samples without the heat treatment step, have tensile strength of 1,100 MPa or more and elongation at break of 10% or more, demonstrating excellent mechanical properties. However, in regard with corrosion resistance, the alloy members M1 and M2 have higher corrosion rates in boiling sulfuric acid than the other materials, more than the criterion of 5 mm/year, which is inappropriate. This is due to corrosion promotion originating from residual stress introduced in the additive manufacturing step, and thus it is confirmed that solution treatment is necessary to improve the corrosion resistance.

The alloy members M1-SA, M2-SA, M1-SLN, and M2-SLN have tensile strength of 1,100 MPa or more and elongation at break of 10% or more, demonstrating excellent mechanical properties. However, in regard with corrosion resistance, the alloy members M1-SA, M2-SA, M1-SLN, and M2-SLN have higher corrosion rates in boiling sulfuric acid than the other materials, more than the criterion of 5 mm/year, which is inappropriate. It is found in an appearance evaluation after the corrosion test that corrosion is progressed originating from the boundary deposition of hexagonal precipitates generated in crystal grain boundaries. This is because the volume percent of the boundary deposition of hexagonal precipitates in such the alloy members is more than 1% and the grain boundary deposition is generated excessively, and thus corrosion resistance in boiling sulfuric acid, which is a comparatively severe testing environment, is deteriorated. Also, in addition to corrosion resistance, ductility of the alloy members M1-SHN-A900 and M2-SHN-A900 is less than 10% and evaluated as "fail". This deterioration in ductility is likely to be caused by the minute precipitates in crystal grains growing 100 nm or more. However, it can also be considered that growth of the boundary deposition of hexagonal precipitates may affect such deterioration of ductility.

The other alloy members (working examples), on the other hand, have tensile strength of 1,100 MPa or more and elongation at break of 10% or more, demonstrating excellent mechanical properties. In regard with corrosion resistance, the corrosion rates in boiling sulfuric acid are reduced, falling below the criterion of 5 mm/year, which is appropriate. There is a relationship among the cooling rate after heat treatment, tensile strength, and elongation at break as shown in FIG. 6: there is a tendency that the faster the cooling rate, the higher the ductility; and the slower the cooling rate, the higher the strength. Also, as shown in FIG. 7, it is found that the corrosion resistance is 5 mm/year, which is equivalent to the criterion, or less if the cooling rate is 110° C./min or more. However, for the test pieces that are water-cooled with the fastest cooling rates (M1-SW and M2-SW), there are micro cracks generated on the outermost surfaces of edge parts of some of the test pieces, and this may be caused by irregular cooling. In view of such point, it is considered that the cooling rate is preferably suppressed to 2400° C./min or less.

Also, for the alloy members applied with the aging treatment after the heat treatment with an intention of increasing minute precipitates (M1-SHN-A600, M1-SHN-A700, M1-SHN-A800, M1-SS-A600, M1-SS-A700, M1-SS-A800, M2-SHN-A600, M2-SHN-A700, M2-SHN-A800, M2-SS-A600, M2-SS-A700, and M2-SS-A800), the respective average diameter of deposition is equivalent to or larger than those of the alloy members M1-SHN, M1-SS, M2-SHN, and M2-SS without the aging treatment, and tensile strength thereof is improved as shown in FIG. 8 while elongation at break thereof is kept at 10% or more.

On the other hand, the alloy members with the aging treatment temperature of 500° C. after the heat treatment (M1-SHN-A500, M1-SS-A500, M2-SHN-A500, and M2-SS-A500) show equivalent results to those of the above-mentioned test pieces without the aging treatment. Also, for the alloy members with the aging treatment temperature of 900° C. (M1-SHN-A900, M1-SS-A900, M2-SHN-A900, and M2-SS-A900), the average diameter of minute precipitates in crystal grains is more than 100 nm, and their mechanical properties are deteriorated remarkably. From the above results, the aging treatment temperature is preferably less than 900° C., at which the average diameter of minute precipitates deposited and dispersed in the parent phase crystals can be 100 nm or less.

The preferred embodiments and working examples of the present invention have been described above merely to help understanding the present invention, and thus the technical scope of the present invention is not limited to the specific structures described above. For example, it is possible to replace some parts of a structure of one embodiment with a structure of another embodiment, or to add a structure of one embodiment to a structure of another embodiment. That is, it is possible to remove, replace with another structure, or add another structure to some parts of the structures of the embodiments or working examples of the present invention. With such adjustments to the embodiments, the alloy members disclosed in the present invention can be applied to corrosion-resistant components that are to be used in resource fields or chemical plants, which are under more severe use environment.

What is claimed is:

1. A method for producing an alloy member, the method comprising the steps of:
    an additive manufacturing step to form products by additive manufacturing using an alloy powder including each of cobalt (Co), chromium (Cr), iron (Fe), nickel (Ni), and titanium (Ti) in a range between 5 at % and 35 at %, Mo in a range of greater than 0 at % and 8 at % or less, and unavoidable impurities for a remainder;
    a heat treatment step to raise a temperature of the products through heating, and holding the products at a holding temperature between 1080° C. and 1180° C.; and
    a forced cooling step to cool the products after the heat treatment in a temperature range from the holding temperature to 800° C. at a cooling rate from 110° C./min to less than 600° C./min, wherein the forced cooling step uses at least one of inert gases of nitrogen, argon, or helium, which are at atmospheric pressure or higher.

2. The method for producing the alloy member according to claim 1, wherein a heating rate of the heating process between 800° C. and 1080° C. in the heat treatment step is 5° C./min.

3. The method for producing the alloy member according to claim 1, wherein a laser beam or an electron beam is used as a heat source for additive manufacturing in the additive manufacturing step.

4. The method for producing an alloy member according to claim 1, comprising an aging treatment step for applying aging treatment to the products at a temperature ranging from 500° C. to less than 900° C. after the forced cooling step.

5. A method for producing an alloy member, the method comprising the steps of:
    an additive manufacturing step to form products by additive manufacturing using an alloy powder including each of Co, Cr, Fe, Ni, and Ti in a range between 5 at % and 35 at %, Mo in a range of greater than 0 at % and 8 at % or less, and unavoidable impurities for a remainder;
    a heat treatment step to raise a temperature of the products through heating, and holding the products at a holding temperature between 1080° C. and 1180° C.;
    a forced cooling step to cool the products after the heat treatment in a temperature range from the holding temperature to 800° C. at a cooling rate between 1000° C./min and 2400° C./min wherein the forced cooling step uses any one of liquids of salt bath, quenching oil, and polymer aqueous solution.

6. The method for producing the alloy member according to claim 5, wherein a laser beam or an electron beam is used as a heat source for additive manufacturing in the additive manufacturing step.

7. The method for producing an alloy member of claim 5, wherein the forced cooling step uses any one of liquids of salt bath and quenching oil.

8. The method for producing an alloy member according to claim 5, comprising an aging treatment step for applying aging treatment to the products at a temperature ranging from 500° C. to less than 900° C. after the forced cooling step.

9. The method for producing the alloy member according to claim 5, wherein a heating rate of the heating process between 800° C. and 1080° C. in the heat treatment step is 5° C./min.

* * * * *